Oct. 29, 1968  KARL-GORAN H. EJEFORS  3,407,934
METHOD AND APPARATUS FOR SEPARATING PARTICLES FROM
SUSPENSIONS SUCH AS SLUDGE AND THE LIKE
Filed April 19, 1966

INVENTOR
KARL-GORAN HENRIK EJEFORS

BY
Woodham, Blanchard & Flynn
ATTORNEYS

United States Patent Office 3,407,934
Patented Oct. 29, 1968

3,407,934
METHOD AND APPARATUS FOR SEPARATING PARTICLES FROM SUSPENSIONS SUCH AS SLUDGE AND THE LIKE
Karl-Goran Henrik Ejefors, Blecktornsgrand 7, Stockholm, Sweden
Filed Apr. 19, 1966, Ser. No. 543,736
Claims priority, application Sweden, Apr. 22, 1965, 5,265/65
1 Claim. (Cl. 210—73)

ABSTRACT OF THE DISCLOSURE

A method of separating particles from suspensions, such as sludge from industrial and municipal sewage purification plants, wherein the suspension is initially subjected to a mechanical centrifugal separation causing the larger and heavier particles to be separated from the remaining fluid. Upon leaving the first separation stage, the fluid contains only microorganisms or particles of comparable weight therein. The fluid is then subjected to a second mechanical centrifugal separation wherein the fluid is subjected to larger separating forces such that the small microorganisms are separated from the liquid, which microorganisms can then be recovered and subjected to further treatment for permitting recovery of vitamins therefrom.

---

Figure 1:
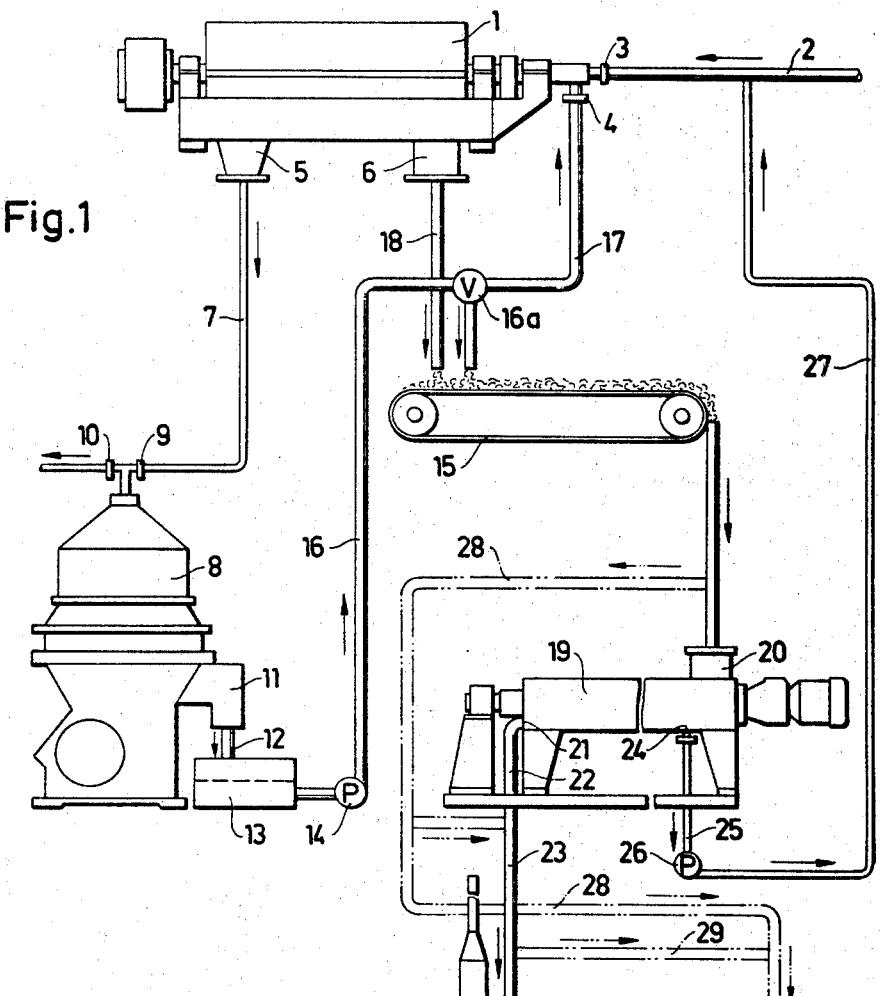

When treating sludge arriving from sedimentation tanks and the like in, sewage purification plants or the like for example separation of particles from the suspension is effected in several steps; the first step being to separate coarse particles, and then to also separate the finer particles from the aqueous suspension obtained at the first mentioned separation process. Conventional means used in such separation processes are, for example, various forms of screens, such as flat screens, drum screens, rotary screens and the like, as well as hydrocyclones—often in several cascades—connected stages—or the like, screen centrifuges, either alone or together with hydrocyclones. However, it has been proved in practice that such devices present such considerable disadvantages in conjunction with the treatment of sludge, fibre suspensions, etc., that they are not suitable for the purpose and are incapable of giving the desired degree of separation necessary in certain cases. Hydrocyclones, and similarly screen centrifuges, are mainly intended for separating crystalline material from suspensions, i.e., suspensions where the particles are constituted of relatively hard material. When treating sewage sludge, the particle masses and mixtures which occur are such that all types of screen devices become very easily choked, which naturally occasions great practical disadvantages. Further, known devices often require the addition of chemicals to the sludge before an acceptable functioning of the system can be achieved. The present invention is intended to remove the above mentioned disadvantages and to provide a considerably higher separation effect than has hitherto been possible without technical operational disadvantages.

The present invention is mainly characterized in that separation is effected by mechanical centrifugal separation, the large and heavy particles in the suspension being separated first, after which the smaller and lighter particles are separated from the fluid obtained from said first separation process; preferably said smaller and lighter particles being further dewatered, either separately or together with the first separated large and heavier particles.

In this context, the expression "mechanical centrifugal separation" is meant to indicate that the suspension is passed to one or more centrifugal separators, each of which may take the form of a rotating drum, for separating the larger and heavier particle in the suspension; the fluid obtained therefrom being passed to one or more additional centrifugal separators having preferably a considerably higher centrifugal force than the first mentioned. The advantages of using said separators instead of hydrocyclones, screens, screen centrifuges, etc., lie, among other things, in that a much greater separation effect can be obtained so that on treating certain types of sewage sludge it is possible, from the separated particles, to also treat microorganisms present in said sludge. Hitherto this achievement has not been possible to any practically applicable degree. On continued separation, however, after the coarse particles have been separated, these microorganisms can be completely separated from the fluid arriving from the first separation process; assuming of course that said fluid has been substantially freed of coarse particles. These microorganism slurries are subjected to further treatment in order to recover vitamins, which is a main object of the invention effect for which the method according to the invention aspires. These effects cannot be achieved when using, e.g., hydrocyclones, screen centrifuges, etc., for separating purposes. It can be mentioned in this context that the optimal separation effect using a hydrocyclone rises to approximately 100 g., whilst the effect with a centrifugal separator can reach up to 10,000 g.

Figure 2:
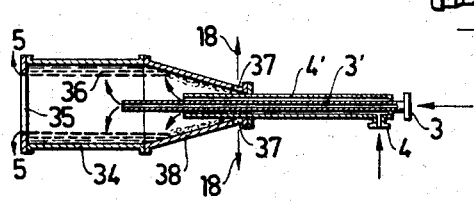

The present invention will be more closely described below with reference to the accompanying drawing, in which FIG. 1 shows an operation diagram of a plant according to the present invention and FIG. 2 shows diagrammatically a section of a centrifugal separating device included in the plant.

The reference numeral 1 in FIG. 1 indicates a centrifugal separator for separating and dewatering coarse particles, said separator in the following being called "the dewaterer" and to which is connected a delivery conduit 2 for the untreated sludge conducted to the plant, e.g., municipal sewage sludge. In the shown embodiment the dewaterer 1 is provided with two inlet ports 3 and 4, the delivery conduit 2 being connected to inlet 3. Further, the dewaterer is provided with an outlet 5 for so called sludge water obtained during the separation of sludge present in the separator, and an outlet 6 for separated particles. The dewaterer 1 is cascade-connected to a self cleaning centrifugal separator 8, provided with partition plates by means of a conduit 7 passing from the outlet 5; the centrifugal separator being called in the following "the separator." The separator 8 is the type which operates with intermittent discharge of separated particles, i.e., is provided with regulatable so called "sludge ports" having relatively large through-flow areas when open. The advantage with such a construction is that blockage of the outlet openings for the separated particles is effectively prevented. In the shown embodiment the separator 8 is provided at the top with an inlet 9 which is formed integrally with an outlet 10. Sludge water is passed through the inlet 9 to the separator 8 from the dewaterer 1 and is further purified in the separator 8 so that it then leaves the same via the outlet 10, as a clarified-water phase. Located on the side of the separator 8 is an outlet 11 for discharging finer sludge particles and microorganisms separated in the separator 8, the particles and microorganisms flowing down, via a conduit 12, into an intermediate tank 13. A pump unit 14 is connected to the intermediate tank 13 and adapted to pump the said sludge particles through a conduit 16 to a conveying means 15. The sludge particles arriving from the pump 14 can be repassed through a three-way valve 16a, located on the conduit 16, to the dewaterer 1 via a conduit 17 connected to the second inlet 4 of said dewaterer. The dewatered particles are removed through the outlet 6 on the dewaterer 1 down through a conduit 18 to the previously mentioned conveying means 15. The particles present on said conveying means 15 are fed down in a combined conveying and dewatering screw device 19 through an inlet 20. The combined conveying and dewatering screw 19 is in the following called "the screw." In the shown embodiment, the screw 19 is provided with an outlet 21 for further dewatered particles which conducted through a conduit 22 and a conduit 23 to a furnace plant 30 or alternatively to a slurry truck 31 indicated by the dot-dash line 29. The conduits 22 and 23 of course can also be constituted of conveyers. The screw 19 is provided with an additional outlet 24 for the sludge water obtained from the screw, said sludge water being led through a conduit 25 to a pump 26 and then through a conduit 27 up to the delivery conduit 2. As indicated by the dash-line 28, the particle material present on the conveying means 15, depending on the required additional treatment of the same, can be passed down direct to said slurry truck or to the conduit 23 for further transport to the furnace plant 30.

For the purpose of illustration FIG. 2 shows a cut-away view of the dewaterer 1. As can be seen, the dewaterer comprises a rotating drum 34 with associated delivery conduits connected to the inlets 3 and 4. The delivery conduits are designed as coaxial pipes 3' and 4' respectively. At the distal end of the drum, viewed from the delivery conduit, annular regulating washers 35 are inserted around the periphery of the drum for regulating the level 36 of the sludge water in said drum. On rotation of the drum 34 the sludge water thus runs over the edge of said annular regulating washers 35 and is thrown out peripherally to, and collected up in the outlet 5—shown diagramatically by the arrows 5. The drum has a conical portion 38 towards the inlet, said portion being provided at its end of smaller diameter with one or more so called sludge ports 37 in the mantle surface; separated large and heavy particles being discharged through said ports. A conveyer screw is used to convey the particles separated on the inner walls of the drum away from said drum, the screw being inserted in the drum 34 and rotates with the same although with a certain time-lag which makes possible the necessary conveying action. For the sake of clarity the conveying screw has not been drawn in the drum 34. As is evident from the drawings, the outer delivery conduit 4', which transfers the separated particles obtained from the separator 8, is somewhat shorter than the delivery conduit 3' and open out approximately opposite the conical portion 38 of the drum 34 so that said particles are discharged in an area for particles already separated and dewatered in the drum.

The above described system functions in the following manner. Untreated sludge arriving from sedimentation tanks or the like in a sewage purification plant is passed, via the delivery conduit 2, to the dewaterer 1. The sludge is conducted into the dewaterer 1 via the inlet 3 and delivery conduit 3'. Due to the actuation of the centrifugal force the heavy and large particles are separated from the sludge suspension towards the inner periphery of the drum 34, see FIG. 2; the previously mentioned screw conveyer in the drum continuously discharging the coarse particles through the sludge ports 37 to the outlet 6. The annular regulating washers 35 located in the end wall of the drum 34 have been adjusted, prior to the plant being started up, to a position suitable for the type of sludge being treated. The liquid level 36 will thus adjust itself according to the setting of the regulating washers 35. The centrifugal force in the dewaterer is adapted suitably to approximately 3–4,000 g., i.e., so that the sludge liquid departing through the outlet 5 contains substantially only microorganisms and particles of weight comparable thereto. When the coarse particles separated in the drum 34 are conveyed upwards by means of the screw conveyer out of the fluid and reach the conical portion 38 of the drum, the dewatering procedure proper of the particles is carried out. The sludge fluid from the dewaterer 1, when it leaves the regulating washers 35 and the outlet 5 through the conduit 7, however, is very impure and is passed to the separator 8 for further treatment. The separator 8, which operates with a much greater separating effect—approximately 10,000 g.—frees the fluid from the majority of particles contained therein as well as microorganisms. When the fluid leaves the separator 8 via the outlet conduit 10 it can be lead away for biological purification or reconducted to a sedimentation tank. The smaller and lighter particles and microorganisms separated in the separator 8 pass through the outlet 11 and conduit 12 to the intermediate tank 13. Depending on the desired further treatment of the particles in question, said particles can be removed direct from the tank for further treatment for, as was mentioned in the preamble, obtaining vitamins from the microorganisms present in the compound.

As has been shown, the particles in the tank 13 can be pumped through the pump 14 and conduit 16 to either the conveying means 15 or, via the three way valve 16a, back to the dewaterer 1 via the conduit 17 and the inlet 4 for additional dewatering; whereby if the last mentioned alternative of repassing the particles from the intermediate tank 13 to the dewaterer 1 is selected said particles, as is evident from FIG. 2, will be forced out as they leave the delivery conduit 4', towards the periphery of the conical portion 38 of the drum 34 and thus above the limit of the water level 36 at the conical portion. In this way the finer particles obtain an additional dewatering with the larger and heavier particles, passed through the inlet 3 and delivery conduit 3' and then separated, as a screen bed. The two types of dewatered particles are passed together from the dewaterer 1, from the outlet 6 via the conveyer means 15 to, if so desired, the above mentioned conveyer and dewatering screw 19. The furnace plant 30 is charged by means of the screw 19 or alternatively by means of the slurry truck 31 in a manner described above in conjunction with the description of the devices proper.

The arrangement of the screw 19 and the furnace plant 30 together with associated conduits as well as the conveying means 15 are naturally not necessary requirements for carrying out the method according to the invention but present a practical further treatment of the material obtained by means of the mechanical centrifugal separation according to the present invention.

It is naturally possible, within the scope of the invention to connect a plurality of dewaterers and/or separators in parallel or series for achieving the required capacity and effect.

What is claimed is:
1. A method of separating microorganisms and particles of like weight from larger and heavier sludge particles and from a suspending liquid, all composing a liquid sludge suspension from sewage purification plants, comprising the steps of:
  delivering the liquid sludge suspension to a first rotating drum mechanical centrifuge and therein subjecting the suspension to a first centrifugal separating force within the range of 3,000 to 4,000 times the force of gravity and thereby separating substantially all solid particles larger and heavier than microorganisms from the liquid while permitting substantially only microorganisms and particles of comparable size and weight to remain suspended in the liquid;
  delivering the liquid exiting from the first rotating drum mechanical centrifuge to a second mechanical centrifuge and therein subjecting said exiting liquid to a second centrifugal separating force which has a value several times larger than said first force and of at least approximately 10,000 times the force of gravity for separating the majority of the microorganisms and the particles of comparable light weight only from the liquid; and recovering the separated microorganisms and particles of comparable light weight for permitting the recovery of vitamins therefrom.

References Cited

UNITED STATES PATENTS

| | | | |
|---|---|---|---|
| 1,873,598 | 8/1932 | Jones | 210—73 X |
| 2,228,017 | 1/1941 | Pecker | 210—73 X |
| 2,462,098 | 2/1949 | Hertrich | 210—78 |
| 2,754,968 | 7/1956 | Vegter et al. | |
| 3,180,824 | 4/1965 | Corey | 210—73 X |
| 3,200,068 | 8/1965 | Jonakin et al. | 210—73 X |
| 3,208,201 | 9/1965 | Oliver III | 210—195 X |
| 3,226,317 | 12/1965 | Albertson | 210—259 X |

FOREIGN PATENTS 866,861  5/1961  Great Britain.

REUBEN FRIEDMAN, *Primary Examiner.*

J. ADEE, *Assistant Examiner.*